United States Patent
Siciliano

[11] 3,783,829
[45] Jan. 8, 1974

[54] MANURE SHEDS AND JOIST CLEANER ARRANGEMENT

[75] Inventor: Anthony J. Siciliano, Vineland, N.J.

[73] Assignee: Diamond International Corporation, New York, N.Y.

[22] Filed: Dec. 23, 1971

[21] Appl. No.: 211,407

[52] U.S. Cl.......................... 119/17, 119/22, 198/224
[51] Int. Cl............................................. A01k 31/04
[58] Field of Search .................. 119/17, 22, 18, 20, 119/19; 198/224

[56] References Cited
UNITED STATES PATENTS

| | | | |
|---|---|---|---|
| 3,312,194 | 4/1967 | Ernst..................................... | 119/22 |
| 2,843,086 | 7/1958 | Graham................................ | 119/22 |
| 2,970,567 | 2/1961 | Rubin.................................... | 119/22 |
| 2,988,204 | 6/1961 | Sutherland..................... | 119/22 UX |
| 3,033,348 | 5/1962 | Andrew.......................... | 198/224 X |
| 3,160,141 | 12/1964 | Crutchfield........................... | 119/22 |
| 3,134,358 | 5/1964 | Byrnes................................... | 119/22 |

Primary Examiner—Louis G. Mancene
Assistant Examiner—James H. Czerwonky
Attorney—Karl W. Flocks

[57] ABSTRACT

A cage-row battery arrangement for raising poultry comprising vertically spaced batteries of pairs of cage rows with the cage rows of batteries at intermediate and lower levels being provided with overhead manure drying sheds to catch droppings from the cage rows thereabove. The batteries are mounted on a framework supported on joist members and are spaced above the joist members. Power actuated scraper means are provided to remove dried manure, dirt or debris from the shed and movable bars are provided to prevent excessive build-up of manure, dirt or debris on the joist members.

18 Claims, 6 Drawing Figures

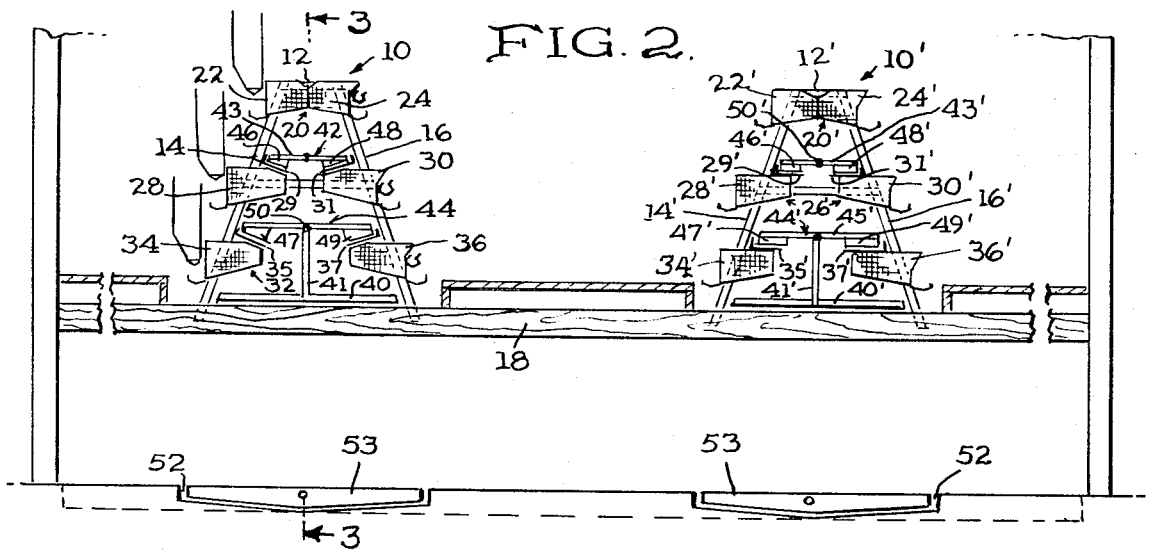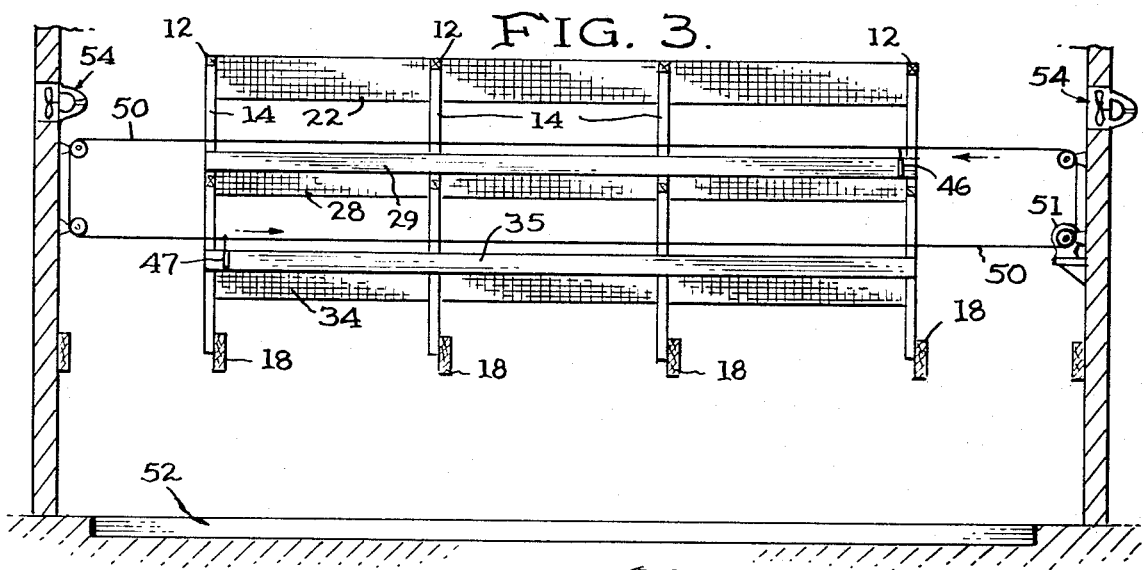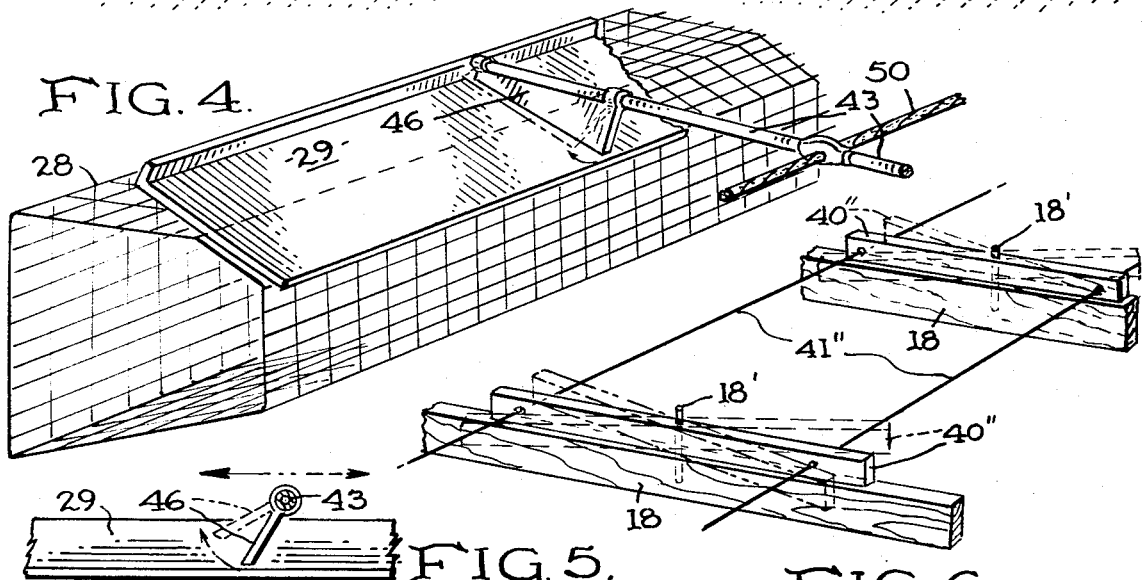

MANURE SHEDS AND JOIST CLEANER ARRANGEMENT

BACKGROUND OF THE INVENTION

1. Field of the Invention

The present invention relates to confining and housing arrangements for poultry, and particularly to a battery caged row arrangement provided with shed elements upon which manure may be caught and dried, and more particularly to such an arrangement equipped with scraping and cleaning elements to remove dried manure, dirt or other debris and preventing excessive build-up thereof.

2. Description of the Prior Art

The problem of manure build-up in commercial poultry houses is well known and its solution has been approached in many ways. Typical of the prior art efforts in the removal of manure from poultry houses are the arrangements of equipment in U.S. Pat. No. 2,970,567 (Rubin) and U.S. Pat. No. 3,033,348 (Andrew). The Rubin patent shows cable driven reciprocating scraper elements in combination with reversing means for use in double-row cage assemblies and also shows means to clean the trough beneath the lower cages. The Andrew patent relates to a reciprocating scraper apparatus for cleaning a poultry house dropping pit and includes cut-off limit switches.

SUMMARY OF THE INVENTION

The present invention relates to a new and improved cage row arrangement and equipment with which poultry manure may be collected and removed therefrom. With the arrangement as disclosed herein, manure droppings may be efficiently collected from the various battery cage rows and efficiently removed after it has been sufficiently dried to facilitate ease of removal and handling. In accordance with the present invention, batteries of cage rows are mounted on a framework supported by a plurality of longitudinally spaced, transversely extending joist members. The batteries of cage rows are arranged at vertically spaced elevational levels with each battery comprising a pair of cage rows. To catch manure dropping from above the batteries situated at the lower and the intermediate elevational levels are provided with overhead drying sheds secured to the roof of each cage row.

The manure caught on the drying sheds may be dried by any conventional method or as disclosed in a co-pending application of which I am a co-inventor. After a sufficient amount of moisture has been removed from the manure collected on the drying sheds, scraping means and cleaning bars may be actuated to remove the manure from the drying sheds and the joist members in the manner described herein.

Power actuated reciprocating scraper members are provided to remove dried manure from the sheds. One or more moving bars is provided to effect removal of manure built up on the joist members. Where a single moving bar member is provided to prevent manure build-up on the joist members, it is interconnected with a lower power actuated scraper assembly for movement therewith over each of the joist members. Alternatively, a plurality of bars may be pivotally supported on each of the joist members by a vertical pivot pin and caused to be oscillated thereabout by a common cable member connected adjacent to at least one end of each of the bars.

The scraper means according to this invention comprises a connecting rod assembly having a scraper blade pivotally connected to each end thereof. The scraper assembly is connected to a power driven cable whereby the scraper blades may be moved in one direction to scrape the dry manure off the sheds. The scraper blade is in the form of a plate which is longer than the vertical height between the connecting rod and the surface of the sheds so that its scraping edge extends to one side of a vertical plane passing through the connecting rod. Because of this relationship between the scraping edge and the surface of the manure drying shed, the scraper blade will be effective to remove manure from the surface of the drying shed when urged in one direction and will glide over the surface and move in the opposite direction.

The drive cable as disclosed is connected to both an upper and a lower scraper assembly to which a joist cleaning bar may be interconnected by a strut for movement therewith. The scraper blades may take the form of a generally triangular plate with a scraping edge overlying the inclined surface of drying sheds which are pitched toward the center of the supporting framework and secured upon the surface of similarly pitched roof portions of the associated cage rows. Alternatively, the scraper blades may be in the form of a generally rectangular plate with the scraping edge overlying the horizontal surface of the drying shed which is secured on the horizontally extending roof of the associated cage row.

BRIEF DESCRIPTION OF THE DRAWINGS

In the accompanying drawings:

FIG. 2 shows an end elevational view on a reduced scale of the preferred embodiment according to this invention on the left and an alternative embodiment on the right;

FIG. 3 is a sectional view taken along the plane of line 3—3;

FIG. 4 is a fragmentary view in perspective of one of the cage rows of the preferred embodiment showing the details of the drying shed and the cooperating scraper assembly;

FIG. 5 is an end view of the scraper blade shown in FIG. 4 when looking toward the shed member to be scraped; and FIG. 6 is a fragmentary view in perspective of a joist cleaner assembly according to this invention.

DESCRIPTION OF THE PREFERRED EMBODIMENT

Figure 1:
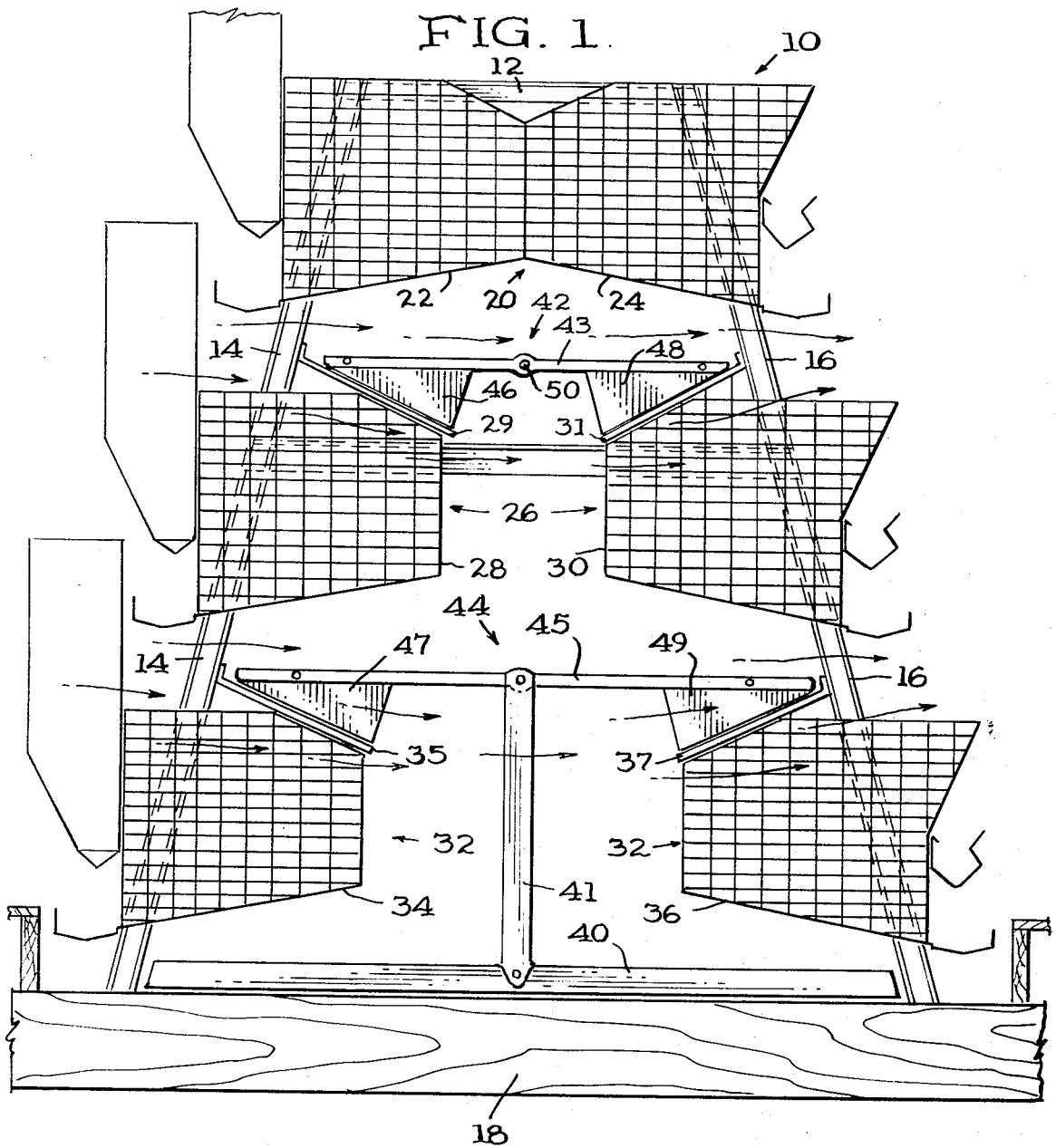
FIG. 1 shows an end elevational view of the preferred embodiment of the arrangement according to this invention.

Referring now more particularly to the drawings, the preferred embodiment according to this invention comprises a battery arrangement 10 of cage rows mounted on a framework 12. The framework 12 is in the form of an A-frame with legs 14 and 16. Each leg 14 and 16 is supported by a transversely extending joist 18. The framework 12 comprises a plurality of pairs of longitudinally spaced legs 14 and 16 supported by spaced joists 18 as best seen in FIG. 3.

As best seen in FIG. 1, each battery of caged rows 20, 26 and 32 are vertically spaced apart from each other along the legs 14 and 16 of the framework 12. The battery 20 comprises a pair of cage rows 22 and 24 mounted at the apex of the framework 12. The intermediate battery 26 comprises a pair of rows of cages 28 and 30 mounted on the legs 14 and 16 respectively and diverging from the center of the framework 12. The lower battery 32 comprises a pair of cage rows 34 and 36 mounted on legs 14 and 16, respectively, and further diverging from the center of the framework 12. Roof portions of the cage rows 28 and 30 are pinched toward the center of the framework 12 and have secured thereover manure drying sheds 29 and 31, respectively, which are pitched at an angle compatible to the pitched roof portions associated therewith. Cage rows 34 and 36 are similarly provided with pitched roof portions and similarly pitched drying sheds 35 and 37, respectively.

An upper shed scraper assembly 42 comprising a connecting rod 43 with scraper blades 44 and 46 pivotally secured on opposite ends thereof is provided to scrape dried manure, dirt or debris from the sheds 29 and 31, respectively. A lower shed scraper assembly 44 comprising a connecting rod 45 having scraper blades 47 and 49 pivotally secured on opposite ends thereof is provided to scrape manure, dirt or debris from the sheds 35 and 37, respectively. Each of the scraper blades 46, 48, 47 and 49 are generally in the form of a triangular plate which is somewhat longer than the vertical distance from the respective connecting rods 43 and 45 to the associated drying shed as shown, for example, in FIGS. 4 and 5 whereby the scraper blade 46 will glide over the surface of the drying shed 29 when moved to the right as shown in phantom and will scrape and remove any manure, dirt or debris from the shed 29 when moved to the left as shown in the position of the solid blade 46. Each of the connecting rods 43 and 45 is in the form of a pipe or tube-like member upon which the scraper blade elements are pivotally secured thereon, as may be seen in FIG. 4, for example.

The upper scraper assembly 42 and the lower scraper assembly 44 are connected to a common drive cable 50 so that they are at opposite ends of travel at the beginning of a scraping cycle as shown in FIG. 3 in which scraper blade 46 of upper scraper assembly 42 is moving to the left as scraper blade 47 of lower scraper assembly 44 is moving to the right. Cable 50, as shown in FIG. 3, is part of an endless cable drive assembly which is driven by a reversible motor 51. Suitable reversing switches are provided at the opposite ends of the travel of the scraper assemblies. A horizontally oriented joist cleaner bar 40 extending parallel to the joist 18 and spaced a slight distance thereabove is rigidly connected to the connecting rod 45 of the lower scraper assembly 44 by a strut 41. Joist cleaner bar 40 thus is carried along with the scraper blades 47 and 49 by connecting rod 45 as it is driven by the cable 50. As the manure, dirt or debris is scraped from the various manure sheds and joist members it may conveniently gravitate to pit 52 therebelow from which it may be removed by pit scraper conveyor 53.

To facilitate drying the manure collected on the various sheds fans 54 may be provided to induce movement of air currents over the manure as described in the copending application mentioned above.

In the normal operation of this invention, the drive motor 51 is actuated to drive scraper 46 and its associated assembly to the left by a drive cable 50 as shown in FIG. 3 from the surface of shed 29 which has been sufficiently dry, for example, by air induced by fan 54. As the scraper blade 46 is moved to the left, the scraper blade 47 is moved to the right and glides over the surface of shed 35. When the scraper assembly 42 has moved to the left end of the shed 29 a limiting reversing switch is actuated to reverse the direction of the motor 51, thereby moving the lower scraper assembly to the left to scrape manure, dirt or debris from the shed 35 as shown in FIG. 3, for example. As the lower scraper assembly 44 is moved longitudinally across the surface of sheds 35 and 37 the joist cleaner bar 40 is moved across portions of the joists 18 extending below the batteries to prevent build-up of any manure, dirt or debris which is scraped off the sheds of the batteries 26, 32 and the various joists 18 may then freely gravitate to the manure pit 52 therebelow and ultimately be removed by scraper conveyor element 53.

The preferred embodiment of this invention thus provides a neat and simple manure cleaning and removing arrangement.

ALTERNATIVE EMBODIMENTS OF THE INVENTION

As an alternative to the preferred battery arrangement 10, a battery arrangement 10' comprises a framework 12' in the form of an A-frame with legs 14' and 16' upon which are mounted batteries 20', 26', etc. in a manner similar to that of the preferred embodiment 10. The battery 20' comprises cage rows 22' and 24', the battery 26' comprises cage rows 28' and 30', etc. The lower cage rows 28', 30', 34' and 36' are provided with completely horizontal roof portions upon which horizontally extending manure sheds 29', 31', 35' and 37' are secured. An upper scraper connecting rod 43' is provided with scraper blades 46' and 48' pivotally secured to opposite ends thereof to scrape manure, dirt or debris from the shed 29' and 31', respectively. A lower scraper assembly 44' includes a connecting rod 45' with scraper blades 47' and 49' pivotally secured to opposite ends thereof to scrape manure, dirt or debris from the surface of sheds 35' and 37', respectively. The scraper blades 46', 48', 47' and 49' differ from the scraper blades 46, 48, 47, and 49, respectively, only in that the former are generally rectangular plates rather than triangular plates to cooperate with the horizontally extending sheds 29', 31' 35' and 37', respectively. A horizontally extending joist cleaner bar 40' is interconnected to the lower connecting rod 45' by strut 41' to be moved therewith by drive cable 50' which is connected to drive both the upper connecting rod 43' and the lower connecting rod 45'.

As an additional modification of the preferred embodiment, a plurality of joist cleaner bars may be individually pivotally mounted on each joist member 18 by a pivot pin 18', as shown in FIG. 6. A cable member 41'' may be attached adjacent either or both ends of each bar 40'' to cause oscillation thereof about the pivot pins to the position shown in phantom and thus eliminate build-up of manure, dirt or debris on the joist 18.

Although I have described my invention with a certain degree of particularity, it is understood that the present disclosure has been made only by way of example and that numerous changes and details of construction and the combination and arrangement of parts may be resorted to without departing from the spirit and scope of the invention as hereinafter claimed.

What is claimed is:

1. A battery cage row arrangement for raising poultry comprising in combination a framework supported on a plurality of exposed, transversely extending, longitudinally spaced joist members, a plurality of batteries of cage rows mounted on said framework and spaced above said joist members, each of said batteries being vertically spaced from each other along said framework at various elevational levels and including a pair of cage rows, a manure drying shed extending over and secured to each cage row having a cage row above it to catch droppings from above, movable scraping means mounted on said arrangement for removing dried manure from each of said sheds, and movable cleaning means also mounted on said arrangement and operable to remove excessive build-up of manure, dirt or debris on said joist members.

2. The battery cage row arrangement according to claim 1 in which said plurality of joist members are longitudinally spaced with respect to said arrangement and extend transversely thereof, and said cleaning means comprises a plurality of bars, one each of which is pivotally supported on a joist member by a vertical pin and adapted to be oscillated thereabout to knock off manure, dirt or debris building up on the joist member associated therewith.

3. The battery cage row arrangement according to claim 2, in which the ends of each of said bars are connected by an actuating cable which may be pulled in the longitudinal direction to oscillate said bars over said joist members to thereby reduce build-up of manure, dirt or debris on said joist member.

4. A battery cage row arrangement for raising poultry comprising in combination a framework supported on a plurality of joist members, a plurality of batteries of cage rows mounted on said framework, each of said batteries being vertically spaced from each other along said framework at various elevational levels and including a pair of cage rows, a manure drying shed extending over and secured to each cage row having a cage row above it to catch droppings from above, scraping means for removing dried manure from each of said sheds, and cleaning means operable to prevent excessive build-up of manure, dirt or debris on said joist members, said plurality of joist members being longitudinally spaced with respect to said arrangement and extending transversely thereof, and said cleaning means including a bar extending a slight distance above said joist members and parallel thereto, and being interconnected to said scraping means by a strut extending between said cleaning means and said scraping means.

5. The battery cage row arrangement according to claim 4 in which each of said manure drying sheds is pitched at an angle toward the center of said arrangement and secured to compatibly pitched roof portions of the cage row associated therewith.

6. The battery cage row arrangement according to claim 5, in which said arrangement includes at least a battery of cage rows at an intermediate level and one at a lower level and wherein said scraping means includes an upper scraper assembly for removing manure, dirt or debris from the sheds of the battery at the intermediate level and a lower scraper assembly for removing manure, dirt or debris from the sheds of the battery at the lower level.

7. The battery cage row arrangement according to claim 6, in which each of said upper and said lower scraper assemblies comprises a pair of blade elements one each of which is adapted to scrape manure, dirt or debris from one of the sheds on a cage row.

8. The battery cage row arrangement according to claim 7, in which each of said upper and said lower scraper assemblies comprises a connecting rod member on which a pair of said blade elements are pivotally mounted on opposite ends thereof and extend down to a shed to be scraped.

9. The battery cage row arrangement according to claim 8 in which each of said blade elements is generally triangular in shape and extends down from said connecting rod onto the shed to be scraped at an angle to the vertical so that scraping is effected when the assembly is urged in one direction and gliding is effected when the assembly is urged in the other direction.

10. The battery cage row arrangement according to claim 9, in which said upper and lower scraper assemblies are connected to and driven by a common drive cable and said strut is connected to said lower scraper assembly for movement therewith.

11. The battery cage row arrangement according to claim 10 in which said common drive cable is an endless cable, is actuated by a reversible motor with the upper scraper assembly being situated at one end of said arrangement when the lower scraper assembly is situated at the opposite end of said arrangement and limit switch means for reversing the direction of said motor when either of said scraper assembly has moved to one end of said arrangement.

12. The battery cage row arrangement according to claim 4 in which each of said manure drying sheds extends in a horizontal plane and is coplanar with a second of said sheds secured to a cage row of the same battery.

13. The battery cage row arrangement according to claim 12 in which said arrangement includes at least a battery of cage rows at an intermediate level and one at a lower level and wherein said scraping means includes an upper scraper assembly for removing manure, dirt or debris from the sheds of the battery at the intermediate level and a lower scraper assembly for removing manure, dirt or debris from the sheds of the battery at the lower level.

14. The battery cage row arrangement according to claim 13 in which each of said upper and said lower scraper assemblies comprises a pair of blade elements one each of which is adapted to scrape manure, dirt or debris from one of the sheds on a cage row.

15. The battery cage row arrangement according to claim 14 in which each of said upper and said lower scraper assemblies comprises a connecting rod member on which a pair of said blade elements are pivotally mounted on opposite ends thereof and extend down to a shed to be scraped.

16. The battery cage row arrangement according to claim 15 in which each of said blade elements is generally rectangular in shape and extends down from said connecting rod onto the shed to be scraped at an angle to the vertical so that scraping is effected when the assembly is urged in one direction and gliding is effected when the assembly is urged in the other direction.

17. The battery cage row arrangement according to claim 16 in which said upper and lower scraper assemblies are connected to and driven by a common drive cable and said strut is connected to said lower scraper assembly for movement therewith.

18. The battery cage row arrangement according to claim 17 in which said common drive cable is an endless cable, is actuated by a reversible motor with the upper scraper assembly being situated at one end of said arrangement when the lower scraper assembly is situated at the opposite end of said arrangement and limit switch means for reversing the direction of said motor when either of said scraper assembly has moved to one end of said arrangement.

* * * * *